United States Patent
Worsham et al.

(12) 
(10) Patent No.: US 7,194,080 B2
(45) Date of Patent: Mar. 20, 2007

(54) AUTOMATICALLY SEQUENTIALLY RINGING ALTERNATIVE TELEPHONE NUMBERS

(75) Inventors: James A. Worsham, Buford, GA (US); David A. Levine, Atlanta, GA (US); Greg N. Patterson, Atlanta, GA (US); Zhiqiang Zeeman Zhang, Marietta, GA (US); Sunil H. Contractor, Marietta, GA (US); Ping Song, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 495 days.

(21) Appl. No.: 09/896,922

(22) Filed: Jun. 29, 2001

(65) Prior Publication Data

US 2003/0002645 A1 Jan. 2, 2003

(51) Int. Cl.
*H04M 3/42* (2006.01)
*H04M 7/00* (2006.01)

(52) U.S. Cl. .............. 379/211.03; 379/207.02; 379/221.08

(58) Field of Classification Search ................. 379/211.02–211.04, 221.08
See application file for complete search history.

(56) References Cited

U.S. PATENT DOCUMENTS

| | | | | |
|---|---|---|---|---|
| 5,163,156 A | * | 11/1992 | Leung et al. ............. 709/215 |
| 5,422,936 A | * | 6/1995 | Atwell ................... 379/88.23 |
| 5,438,568 A | | 8/1995 | Weisser, Jr. ................ 370/60 |
| 5,487,111 A | * | 1/1996 | Slusky .................. 379/211.03 |
| 5,502,762 A | | 3/1996 | Andrew et al. |
| 5,706,339 A | * | 1/1998 | Eisdorfer et al. ....... 379/211.03 |
| 5,890,064 A | | 3/1999 | Widergen et al. |
| 5,896,448 A | * | 4/1999 | Holt .................... 379/221.03 |
| 5,905,789 A | * | 5/1999 | Will .................... 379/211.03 |
| 5,963,864 A | | 10/1999 | O'Neil et al. ............. 455/445 |
| 6,330,322 B1 | * | 12/2001 | Foladare et al. ........ 379/211.01 |
| 6,337,857 B1 | | 1/2002 | Booton |
| 6,381,323 B1 | | 4/2002 | Schwab et al. |
| 6,404,875 B2 | * | 6/2002 | Malik et al. ........... 379/211.03 |
| 6,718,026 B1 | * | 4/2004 | Pershan et al. ........ 379/211.01 |
| 6,748,066 B1 | * | 6/2004 | Espejo et al. ............ 379/114.2 |
| 6,785,560 B1 | * | 8/2004 | Chow et al. .............. 455/564 |

OTHER PUBLICATIONS

"Home of Simultaneous Ring™", 2002 SimulRing, Inc., "www.simulring.com".

(Continued)

*Primary Examiner*—Benny Quoc Tieu
(74) *Attorney, Agent, or Firm*—Thomas, Kayden, Horstemeyer & Risley

(57) ABSTRACT

A Service Control Point (SCP) has a call list associated with the main telephone number of a called party. When a calling party attempts to contact the called party by calling the main number, but cannot reach the main number, a Service Switching Point (SSP) fires a trigger. One trigger is a T_No_Answer trigger, which is fired in response to a call to the main number that is not answered within a predefined number of rings. Another trigger is a T_Busy trigger that is fired in response to a call to the main number that is made when the main number is busy. Each trigger causes the SCP to access the call list and to cause the SSP to ring an alternative telephone number associated with the main telephone number. If this attempt to reach the called party also fails, then the SSP again fires the trigger and an attempt is made to connect the calling party to the next number on the call list. If the call list is exhausted before the calling party is connected to a number on the called party's call list, then a message can be played to the calling party. Alternatively, the calling party may be connected to a voice mailbox associated with the called party or may receive a busy tone.

32 Claims, 5 Drawing Sheets

OTHER PUBLICATIONS

U.S. Appl. No. 09/966,338, filed Sep. 28, 2001, entitled "Automatically Simultaneously Ringing Alternative Telephone Numbers", Inventors: Levine et al.

U.S. Appl. No. 10/113,399, filed Apr. 1, 2002, entitled "System and Method for providing a Simultaneous Ring Service for Multiple Landline or Wireless Telecommunications Units", Inventors: Levine.

* cited by examiner

AUTOMATICALLY SEQUENTIALLY RINGING ALTERNATIVE TELEPHONE NUMBERS

FIELD OF THE INVENTION

The present invention generally relates to providing a telephonic connection between a calling party and a called party. More particularly, the present invention relates to attempting to connect the calling party to the called party by sequentially ringing numbers in an alternative number list associated with a main number of the called party.

BACKGROUND OF THE INVENTION

The popularity of the cellular telephone evidences the fact that modern telephone users desire to be reachable to calling parties without being restricted by physical location. Before cellular telephones were so widely available, telephone users in many areas could subscribe to a call forwarding service from their local telephone service provider. Call forwarding could be used to associate the subscriber's main number with an alternative number. When a calling party attempted to reach the subscriber, while the call forwarding service was activated, the alternative number would be rung, instead of the main number. Thus, a subscriber could enjoy the freedom to change its physical location, while maintaining some ability to receive calls that were actually made to the user's main number. The subscriber could typically forward incoming calls to any other telephone number.

Typically, there are two main classes of call forwarding services, including Switch-based and Advanced Intelligent Network (AIN) based. Switch-based call forwarding is done entirely by the home switch (the switch the customer is connected to). Any customer interactions to set, change, or delete a forwarding number occur with the subscriber (customer) accessing directly the switch. Such a system is usually simple, but the service provide by that system is "as is", and cannot easily be modified or customized.

AIN-based call forwarding services involve a trigger and a query/response from a service control point (SCP). Such a system can be modified and customized more easily, but additional resources are often needed such as a trigger in the switch. Typically, once a trigger is provisioned on a customer's line, the trigger cannot be used for multiple services. That is, the trigger can only be mapped to a single service on the SCP. Depending on what the service does, additional resources may be required such as the involvement of a service node (SN). For example, as with so called "flexible call forwarding", a service node primarily is used to play announcements and to collect digits from the customer to change call forwarding settings, but usually it is not used during call processing. Accordingly, disadvantages of an AIN-based system involve the use of other resources such as triggers, SCP, and service node, plus additional trunking services.

Therefore, there is a need in the art for an alternative number ringing system that can support the dialing of more than two alternative numbers associated with a main telephone number. The system should not rely upon the resources of an Advanced Intelligent Network's Services Node. The system also should ring the alternative numbers in a predefined sequence maintained in the call list, so that only one alternative number is rung at a time. The system also should enable the easy configuration of the call list by a subscriber and should enable the use of multiple call lists.

SUMMARY OF THE INVENTION

An exemplary embodiment of the present invention utilizes a Sequential Ring Application that is installed on a Service Control Point (SCP). The Sequential Ring Application (SRA) can be implemented as a software and/or hardware application executable by the SCP. The SRA of an exemplary embodiment of the present invention enables the SCP to sequentially ring alternative phone numbers associated with a called telephone. Advantageously, the SRA enables the elimination of the use of a Services Node to attempt connections to alternative telephone numbers associated with a main telephone number. When a calling party makes a call on the calling telephone, the calling SSP contacts the called SSP to attempt to connect the call, as described above. Triggers are provisioned on SSPs, including the called SSP that will fire in certain conditions. If the called telephone is being used at the time of a call attempt from the calling telephone, a T_Busy trigger is fired at the called SSP. If the called telephone rings for more than a pre-defined ring count without being answered, a T_No_Answer trigger is fired at the called SSP.

When the SCP detects the of the query resulting from the T_No_Answer trigger or of the T_Busy trigger, the SCP determines the called telephone number from a data packet sent by the called SSP over an SS7 data link. The SCP will determine that the Sequential Ring Application (SRA) should be invoked to supply an alternative number in response to the query that was received after the T_No_Answer trigger or the T_Busy trigger were triggered in the SSP the received the call.

When the SRA is invoked, the SRA will access a database associated with the SCP to obtain a call list associated with the called telephone number. The SRA will determine a first alternative number and will send an instruction to the triggered SSP to ring the alternative number. In addition, the SRA will cause the SCP to send a Next Event Request to the called SSP. The Next Event Request is a request that the SCP request to the SCP to notify to the SCP as to the specific outcome of the call attempt to the number. If the call attempt to the first number is successful, (i.e. the telephone is answered), the called SSP will, if requested by the SCP through the Next Event Request, notify the SCP that the call was successful.

If the call attempt to the number is unsuccessful, because the line is busy, the called SSP will, if requested by the SCP through the Next Event Request, notify the SCP of the busy status and ask for further instructions. Finally, if the telephone associated with the called attempt is not answered within a specified time frame, the called SSP will, if requested by the SCP through the Next Event Request, notify the SCP that the call attempt was not answered and ask for further instructions.

Because the SRA will be given control of the call, the SRA can determine whether any subsequent call attempts need to be made. If the call attempt to the first alternative telephone number is unsuccessful (e.g., busy or no answer), then the SRA will cause a similar call attempt to be made to the second alternative telephone number in the call list. This pattern will repeat until either a call is completed or the call list is exhausted (i.e., no un-tried alternative telephone numbers remain in the call list).

Advantageously, the sequential alternative number ringing system of exemplary embodiments can attempt to contact a called party by making call attempts to predefined alternative telephone numbers. A predefined sequence of the alternative telephone numbers listed in the call list can be determined by various means. Because the sequential alternative number ringing system does not utilize a Services Node to place calls to the alternative telephone numbers, the system is a much more efficient implementation.

The various aspects of the present invention may be more clearly understood and appreciated from a review of the following detailed description of the disclosed embodiments and by reference to the drawings and claims.

DETAILED DESCRIPTION

Figure 1:
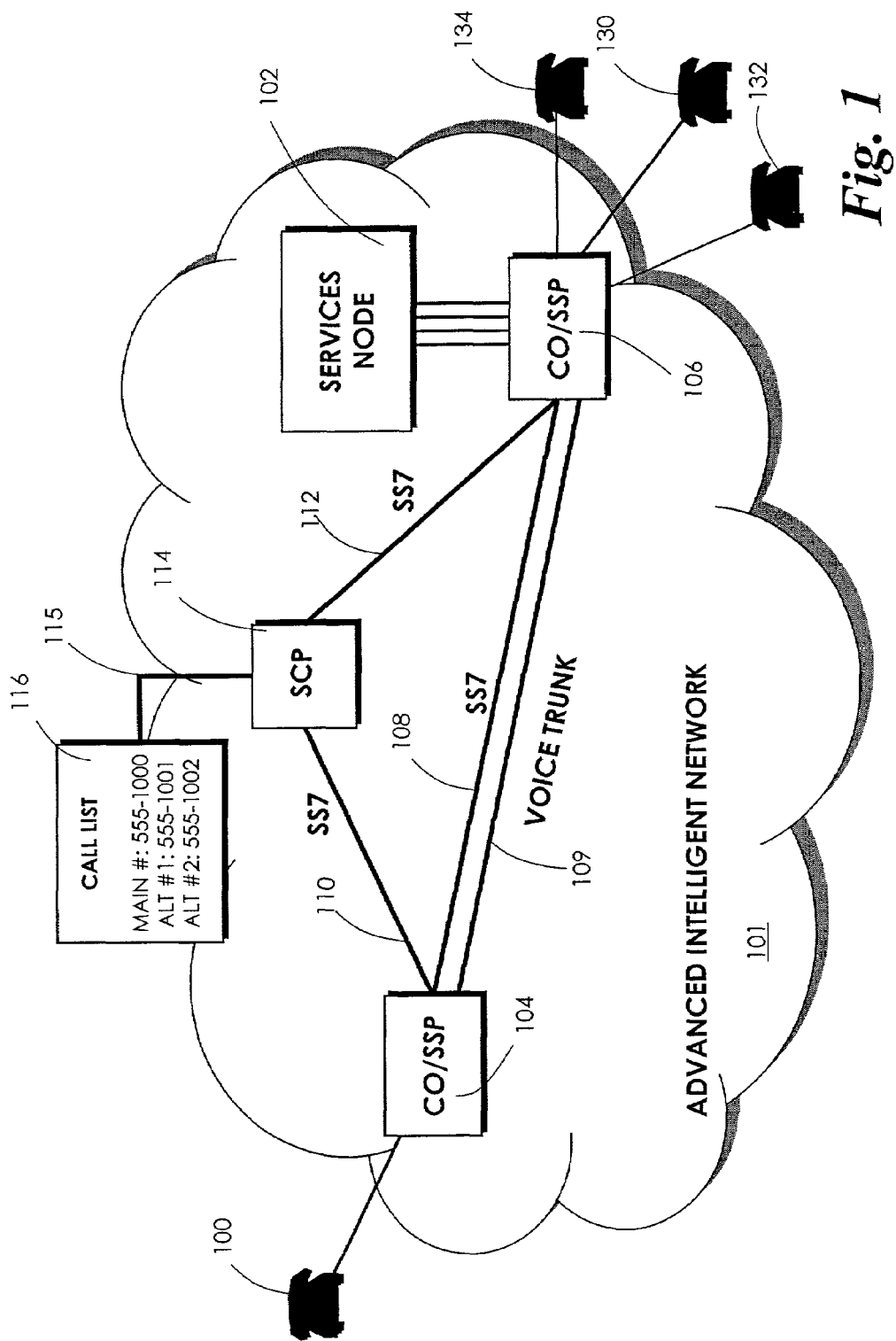
FIG. 1 is a block diagram depicting a conventional call forwarding system that operates within a conventional Advanced Intelligent Network.

FIG. 1 is a block diagram depicting a conventional call forwarding system that operates within a conventional Advanced Intelligent Network. Modern telephone switching conforms to a telecommunications protocol referred to as Signaling System 7 (SS7). The AIN 101 is a telecommunications switching network that utilizes the well-known SS7 protocol to connect switching centers and other telecommunications resources to provide call routing and various other services to telephone users. Essentially, the AIN 101 is a collection of telecommunications components and interconnections that support the provisioning of AIN messages known as triggers and enable the components to respond to fired triggers by generating responses or by executing an associated instruction. Some AIN components can generate queries and other AIN components can generate responses to queries. Some queries are generated after a certain condition occurs, for example, the firing of a trigger at an SSP.

A conventional voice line telephone 100 is connected to the AIN 101 at a switch 104. The switch 104 is also referred to as Service Switching Point (SSP) 104, because of its ability to operate as a switching component of the AIN 101 housed at a central office. The switch 104 will, hereinafter, be referred to as the SSP 104. An SSP 104 may have a plurality of subscriber lines connected thereto, such as a wireline telephone 100. The AIN 101 can have an indefinite number of SSPs 104, 106. The SSPs 104 and 106 communicate with each other over an SS7 protocol data communication link 108 and with other AIN telecommunications components over other SS7 data links 110, 112. Calls can be connected between SSPs 104, 106 over a voice trunk 109. The SS7 data links 108, 110, 112, are used to coordinate the routing of calls and other network functions, while the voice trunk 109 is used to support voice connections between telephones 100, 130, 132, 134.

Much of the intelligence utilized by the AIN 101 to switch calls and provide other telecommunications services resides in a Service Control Point (SCP) 114. As is known to those skilled in the art, SCPs 114 were initially integrated into the network 101 to handle message translations and billing transactions for the implementation of 800-number services. An 800 number subscriber has at least one telephone number that can be called by a telephone user. Because there is no physical Central Office or geographic area that corresponds to the 800-area code, it is more economical to provide a few central locations at which a lookup of the directory number for an 800 call can be made, than to provide the requisite translation information at all SSPs 104, 106. SCPs 114 may have associated databases for directory numbers corresponding to functional 800 numbers.

SCP 114 also may have databases that identify customers that are subscribers to one or more telecommunication services (e.g., caller ID). To maximize the efficiency of processing data and calls at each SSP 104, 106, relatively small sets of triggers are defined. A trigger in the AIN 101 is an event associated within a call instance that generates a data packet to be sent from an SSP to a SCP 114. The trigger causes the SCP 114 to query associated databases to determine whether some calling feature or service should be implemented for a particular call. The instructions based on this query are returned to the SSP 104, 106 from the SCP 114 in a return data packet over an SS7 datalink 108, 110, 112.

The return data packet includes instructions to the SSP 104, 106 as to how to process the call. The instructions may be to take some special action as a result of a calling feature or service, or may simply be an indication that there is no entry in the database that indicates that anything other than ordinary telephone switching should be provided for the call. The SCP 114 is a sophisticated, computerized switching system that responds to data packets and/or triggers over the SS7 data links 110, 112 to route calls and to interconnect other telecommunications components and AIN users to provide telecommunications services.

In summary, the AIN 101 is a complex, high-speed, high call volume system that provides a great deal of versatility in the handling of telephone calls. The SSP 104, 106 can launch a query in response to the receipt of notification of an incoming call (from another AIN component) and then wait for a response from the SCP 114 before proceeding with call processing. More detailed information regarding the AIN 101 can be found in U.S. Pat. No. 5,430,719, which is commonly assigned to BellSouth Intellectual Property Management Corporation and is incorporated herein by reference.

In the example depicted in FIG. 1, a user of the telephone 100 can ring another telephone 130 by dialing a directory number associated with the telephone 130. A voice link can be created between the calling telephone 100 and the called telephone 130 over the voice trunk 109, if the called telephone 130 is answered in response to the ring. If the called telephone 130 is not answered and the called telephone 130 is a subscriber to a conventional call forwarding service, a second telephone 132 may be rung in an attempt to connect the calling telephone 100 to a called party associated with the called telephone 130 and the second telephone 132. Alternatively, a third telephone 134 associated with the called party may be rung simultaneously.

The conventional call forwarding system depicted in FIG. 1 is primarily enabled through the coordinated functionality of the SCP 114 and of the SN 102. In conventional call forwarding systems, the SN 102 is used primarily for customer data input. Because the typical SN 102 is expensive, the call list 116 associated with a main number of the called telephone 130 typically has only one or two alternative numbers listed therein.

Figure 2:
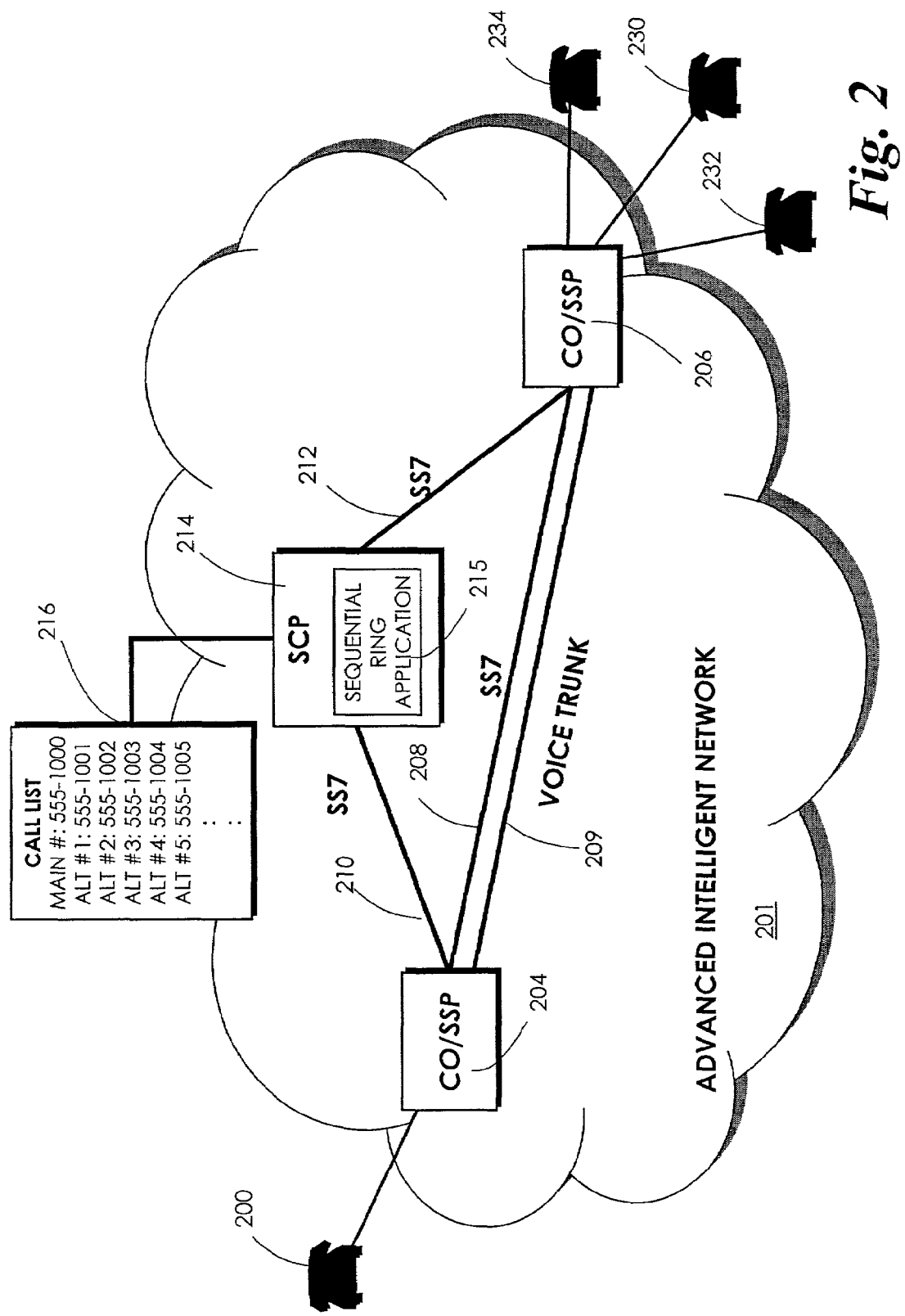
FIG. 2 is a block diagram depicting a sequential alternative number ringing system that is an exemplary embodiment of the present invention that operates within a conventional Advanced Intelligent Network.

FIG. 2 is a block diagram depicting a sequential alternative number ringing system that is an exemplary embodiment of the present invention that operates within an Advanced Intelligent Network (AIN). The AIN 201 of FIG. 2 includes the necessary network elements to connect a call between a calling telephone 200 and a called telephone 230. As described above in connection with FIG. 1, the calling telephone 200 can be used to dial a main telephone number associated with the called telephone 230. The call attempt will be initially processed by the calling SSP 204 which will contact a called SSP 206 associated with the called telephone 230. The calling SSP 204 will contact the called SSP 206 over SS7 datalink 208. The called SSP 206 will ring the called telephone 230 in the conventional manner. If the called telephone 230 is answered, the called SSP 206 will notify the calling SSP 204 that the called telephone 230 has been answered. The calling SSP 204 and the called SSP 206 will cooperate to establish a voice connection over a voice trunk 209. The voice connection will allow a calling party using the calling telephone 200 to conduct a conversation with a called party using the called telephone 230.

If the called party does not answer the called telephone 230, the call may be routed to a voice mail system maintained by a called party or a local telephone service provider of the called party. Alternatively, if the called party is using the called telephone 230 when the call attempt is made, the calling party may receive a busy tone. As still another alternative, a call forwarding system may be implemented, as described in FIG. 1, to forward the call to one (or more) alternative telephone number(s).

Yet another alternative is provided by the exemplary sequential alternative number ringing system depicted in FIG. 2. This system utilizes a sequential ring application 215 that is installed on the SCP 214. The Sequential Ring Application (SRA) 215 can be implemented as a software and/or hardware application executable by the SCP 214. The SRA 215 enables the SCP 214 to sequentially ring alternative phone numbers associated with a called telephone 230. Advantageously, the SRA 215 enables the elimination of the use of a Services Node (not shown) to attempt connections to alternative telephone numbers associated with a main telephone number.

When a calling party makes a call on the calling telephone 200, the calling SSP 204 contacts the called SSP 206 to attempt to connect the call, as described above. When the called SSP 206 receives the notification from the calling SSP 204 that a call attempt is being made to the called telephone 230, the called SSP 206 can recognize that the call attempt is being made to a subscriber of a sequential ring service. Triggers are provisioned on SSPs, including the called SSP, that will fire in certain conditions. Those skilled in the art will appreciate that various triggers could be used to indicate the existence of various network conditions. For example, the well-known T_No_Answer trigger can be used to initiate network activity, in response to a determination that a particular call attempt has not been answered. Similarly, a T_T_Busy trigger can be used to indicate that a call attempt has been made to a called telephone that is busy at the time of the call.

The T_No_Answer trigger and the T_Busy trigger may be provisioned on the SSP 206 to respond to a condition of the called telephone. If the called telephone 230 is being used at the time of a call attempt from the calling telephone 200, the T_Busy trigger can be fired by the called SSP 206. If the called telephone 230 rings for more than a pre-defined time without being answered, the called SSP 206 can fire the T_No_Answer trigger.

When the SCP 214 detects the firing of the T_No_Answer trigger or of the T_Busy trigger, the SCP will determine the called telephone number from a data packet sent by the called SSP 206 over an SS7 data link 212. The SCP 214 will then access a database to determine the services that apply to the called telephone number and to the fired trigger. In this case, the SCP 214 will determine that the sequential ring application (SRA) 215 should be invoked to supply an alternative number in response to the firing of the T_No_Answer trigger or of the T_Busy trigger.

When the SRA 215 is invoked, the SRA will access a database associated with the SCP 214 to obtain a call list 216 associated with the called telephone number. The SRA 215 will determine a first alternative number and will send an instruction to the called SSP 206 to ring the alternative number. In addition, the SRA 215 will cause the SCP 214 to send a Next Event Request to the called SSP 206. The Next Event Request is a request that the called SSP 206 notify the SCP 214 as to the specific outcome of the call attempt to the first alternative number and wait for instructions from the SCP 214 to process the call. If the call attempt to the first alternative number is successful (i.e., the telephone is answered), the called SSP 206 may notify the SCP 214 that the call was successful. If the call attempt to the first alternative number is unsuccessful, because the line is busy, the called SSP 206 may notify the SCP 214 of the busy status and wait for instructions from the SCP 214. Finally, if the telephone associated with the first alternative telephone number is not answered within a predefined number of rings, the called SSP 206 will notify the SCP 214 that the call attempt was not answered and wait for instructions from SCP 214.

Because the SRA 215 will be notified of the status of a call attempt to an alternative telephone number, the SRA can determine whether any subsequent call attempts need to be made. If the call attempt to the first alternative telephone number is unsuccessful (e.g., busy or no answer), then the SRA 215 will cause a similar call attempt to be made to the second alternative telephone number in the call list 216. This pattern will repeat until either a call is completed or the call list is exhausted (i.e., no untried alternative telephone numbers remain in the call list).

Advantageously, the sequential alternative number ringing system depicted in FIG. 2 can attempt to contact a called party by making call attempts to alternative telephone numbers predefined by the called party. A predefined sequence of the alternative telephone numbers listed in the call list 216 can be determined by various means. For example, the sequential ring service subscriber may list the telephone numbers in an order beginning with the telephone number at which it is most likely that the subscriber will be found and ending with the telephone number at which it is least likely that the subscriber will be found. Alternatively, the alternative telephone numbers in the call list 216 may be automatically ordered by calculated probabilities based on the historical likelihood of connecting a calling party to each alternative telephone number in the call list. Those skilled in the art will appreciate that various other ordering schemes may be used.

Another advantage of the sequential numbering ringing system of FIG. 2 is that it does not use a Service Node (SN).

Hence, the system is much more efficient. In addition, the call list 216 need not be arbitrarily limited to conserve the SN resources, as is the case with flexible call forwarding-based systems.

Figure 3:
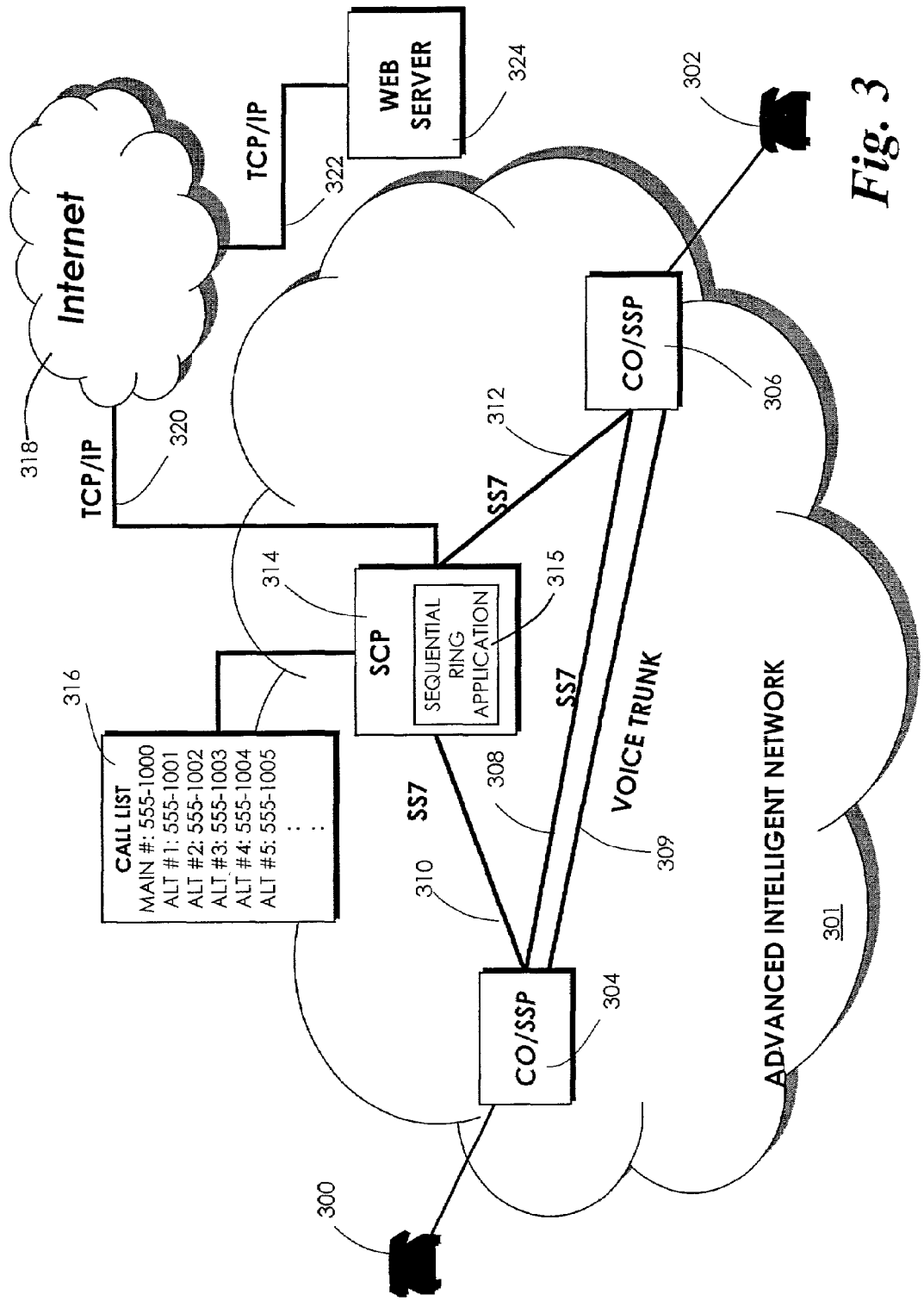
FIG. 3 is a block diagram depicting a sequential alternative number ringing system that is an alternative embodiment of the present invention that operates within a conventional Advanced Intelligent Network.

FIG. 3 is a block diagram depicting a sequential alternative number ringing system that is an alternative embodiment of the present invention. The sequential alternative number ringing system of FIG. 3 includes an SRA 315 running on an SCP 314. The SRA sends a response to queries launched by a called SSP 306 when a calling party telephone 300 attempts to make a call to called party telephone 302, when the called party telephone is busy or is not answered. On the other hand, when a call can be completed between the calling party telephone 300 and the called party telephone 302, the calling SSP 304 will communicate with the called SSP 306 over the SS7 data link 308 to set up a voice connection over a voice trunk 309.

The SRA 315 depicted in FIG. 3 has added functionality as compared with the SRA 215 depicted in FIG. 2. The SRA 315 permits the creation and modification of a call list 316 through a non AIN element entity, such as web server 324. For example, the web server 324 could be connected to the SCP 314 via the Internet 318 or other communications network. The web server 324 could be connected by TCP/IP (Transmission Control Protocol/Internet Protocol) data links 320, 322 to the SCP 314. The SRA 315 could process instructions received from the web server 324 to create and modify a call list 316 stored in the SCP 314 or in a database associated with the SCP. Similarly, the SRA 315 could provide call list information to the web server 324 over such a network connection. For example, the web server 324 could query the SRA 315 to obtain raw call list data or the SRA 315 could be configured to produce formatted call lists data, such as in HTML-formatted web pages.

The system of FIG. 3 enables a user or other third party to access the web server 324 through the Internet 318. The user may be required to log into a web site hosted by the web server 324 and to produce authorization credentials. Once authorized, the user can create and/or modify call lists 316 for which the user has provided proper authorization credentials. This functionality can, for example, be used to alter the sequence order of the alternative telephone numbers in a call list 316. This functionality could also be used for enabling and disabling the sequential ring service. Those skilled in the art will appreciate that enabling network access to the SCP 314 and the SRA 315 could be used for various advantageous purposes within the scope of the present invention.

Figure 4:
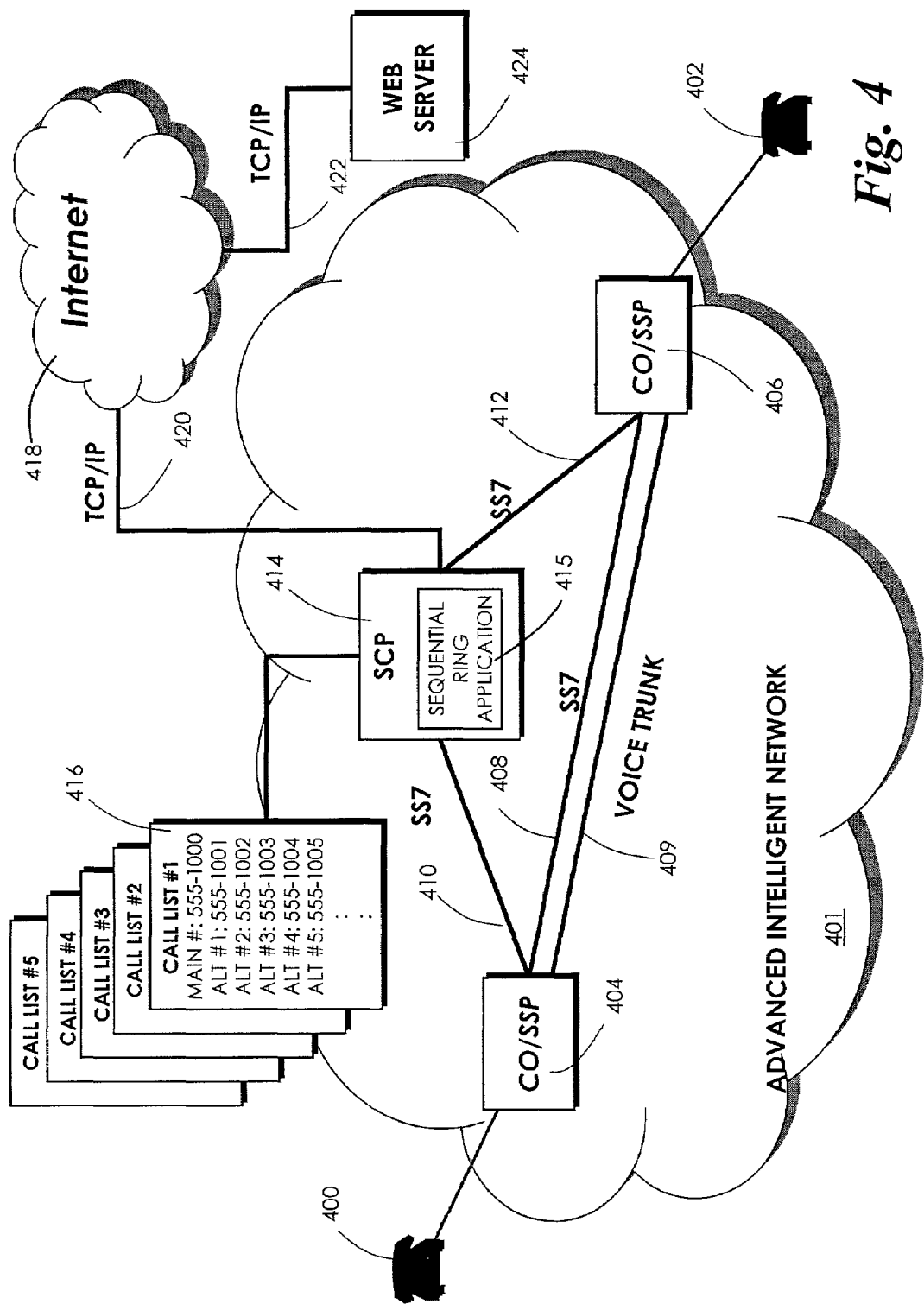
FIG. 4 is a block diagram depicting a sequential alternative number ringing system that is another alternative embodiment of the present invention that operates within a conventional Advanced Intelligent Network.

FIG. 4 is block diagram depicting a sequential alternative number ringing system that is another alternative embodiment of the present invention. As with the sequential alternative number ringing systems described in connection with FIGS. 2 and 3, the SCP 414 of FIG. 4 provides a platform for an SRA 415. The SRA 415 is responsive to triggers fired by a called SSP 406 and received by the host SCP 414 over SS7 data link 412. However, the SRA 415 of FIG. 4 also accommodates the use of multiple call lists 416.

The multiple call lists 416 can be associated with a single main telephone number corresponding to a called telephone 402. However, one or more call lists may be selectively active at any given time. The SRA 415 can be configured to automatically determine whether a call list 416 is enabled or disabled. Advantageously, third party access through a web server 424 can be employed to permit the manual selection of enabled and disabled call lists 416 or the creation of rules that govern the automatic determination of enabled and disabled call lists.

Accordingly, a user can create a variety of call lists to be used in various conditions. The user may, for example, create a workday call list, a weekend call list, and a vacation day call list. A call list may be appropriate for a particular situation, based on the sequenced order of the alternative telephone numbers in the call list 416 or on the number of alternative telephone numbers included in a particular call list 416.

The SRA 415 may be configured by the user or someone else to automatically determine which call list is an applicable. For example, a first call list may be applicable during work hours, while another call list is applicable during evening hours. In addition, the call lists may be selected based on the identity of a calling party. If, for example, the sequence ring subscriber's spouse is calling, a more extensive call list 416 may be employed than when an unknown party (i.e., unidentified) is attempting to call the subscriber. The SRA 415 can obtain caller identification information that is made available to the SCP 414 over the SS7 data links in the conventional manner.

Figure 5:
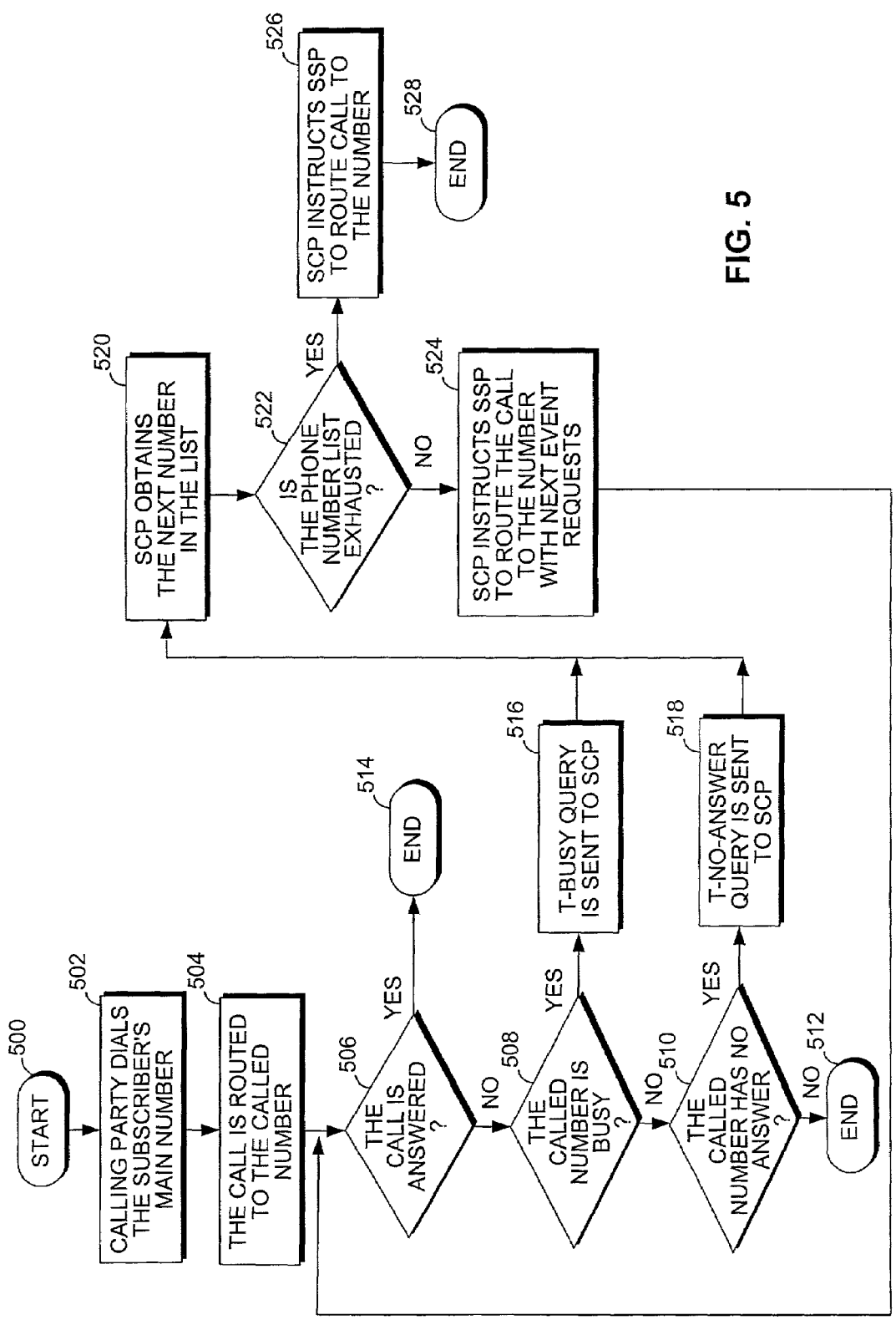
FIG. 5 is a flow chart depicting an exemplary method for sequentially ringing alternative numbers associated with a called party's main number.

FIG. 5 is a flow chart depicting an exemplary method for sequentially ringing alternative telephone numbers associated with a called party's main number. The method begins at start block 500 and proceeds to step 502 where the calling party dials the main number of the called party. The method then proceeds to step 504 and the call is routed to the called number.

At decision block 506, a determination is made as to whether the call is answered. If the call is answered, the method proceeds to step 514 and ends. If the call is not answered, the method proceeds to decision block 508 where a determination is made as to whether the called number is busy. If the called number is busy, the method proceeds to step 516 and a T_Busy query is sent to the SCP.

If at decision block 508 the called number is not busy, the method proceeds to decision block 510 where a determination is made as to whether the called number has no answer. If the called number has an answer, the method proceeds to step 512 and ends. If, however, the called number has no answer at decision block 510, the method proceeds to step 518 and a T_No_Answer query is sent to the SCP.

If either the T_Busy query or the T_No_Answer query are sent to the SCP at steps 516 or 518, the SCP, at step 520, obtains the next number in the call forwarding number list. Next, the method proceeds to decision step 522, and a determination is made as to whether the call forwarding phone number list is exhausted. If so, the method proceeds to step 526, and the SCP instructs the SSP to route the call to the originally called number, and the method ends at step 528.

If at step 522 the call forwarding phone number list is not exhausted, the method proceeds to step 524 and the SCP instructs the SSP to route the call to the number obtained from the call forwarding number list with the Next Event Request. The method then proceeds back to step 506 where a determination is made as to whether the number to which the call is routed is answered. The method then proceeds as described above until the call is answered or until all call forwarding numbers on the number list are exhausted.

Accordingly, the method of FIG. 5 will attempt to connect a calling party to a called party's main telephone number. If this connection cannot be made, the method will determine whether the called party is a sequential ring subscriber. If the called party is a sequential ring subscriber, the method will access a call list and attempt to place the call to each of the alternative telephone numbers included in the call list. The method will track the outcome of the call attempt made to each alternative telephone number. When a successful connection is made, the method will stop any subsequent attempts. On the other hand, when a call attempt cannot be completed, the method will access the call list to get a next alternative number and will attempt to contact that alternative number. When the call list is exhausted, the method will stop.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A sequential number ringing system connecting a calling party to a first alternative number associated with a main number dialed by the calling party, the system comprising:
    a Service Control Point (SCP) with a sequential ring application (SRA) resident thereon; and
    a first call list associated with the main number and containing the first alternative number; and
    a second call list containing at least one second alternative number;
    a Service Switching Point (SSP) provisioned with a trigger list associating the main number with a T_Busy trigger and with a T_No_Answer trigger;
    wherein the SSP connects the calling party to the main number in response to the main number being answered;
    wherein the SSP is further operative to fire the T_Busy trigger in response to a determination that a call to the main number cannot be connected because the main number is busy;
    wherein the SSP is further operative to fire the T_No_Answer trigger in response to a determination that a call to the main number cannot be connected because the main number is not answered within a predefined ring number;
    wherein the SRA is operative to cause the SSP to connect the calling party to the first alternative number, in response to a determination that the T_Busy trigger has been fired;
    wherein the SCP is communicatively coupled to a plurality of SSPs; and
    wherein the SRA is operative to cause the SSP to connect the calling party to the first alternative number, in response to a determination that the T_No_Answer trigger has been fired;
    wherein the first call list is used under a first set of conditions and the second call list is used under a second set of conditions, the second set of conditions different from the first set of conditions.

2. The sequential number ringing system of claim 1, wherein the call list contains a second alternative number.

3. The sequential number ringing system of claim 2,
    wherein the SRA is operative to cause the SSP to connect the calling party to the second alternative number, in response to a determination that a telephone associated with the first alternative number is busy; and
    wherein the SRA is operative to cause the SSP to connect the calling party to the second alternative number, in response to a determination that a telephone associated with the first alternative number is not answered.

4. The sequential number ringing system of claim 3, wherein a determination that the telephone associated with the first alternative number is busy is made by detecting a next event notification.

5. The sequential number ringing system of claim 3, wherein a determination that the telephone associated with the first alternative number is not answered is made by detecting a next event notification.

6. The sequential number ringing system of claim 2, wherein the first alternative number is associated with a first likelihood, the first likelihood indicating the probability that a call can be completed to the first alternative number; and
    wherein the second alternative number is associated with a second likelihood, the second likelihood indicating the probability that a call can be completed to the second alternative number.

7. The sequential number ringing system of claim 6, wherein the first alternative number and the second alternative number are ordered within the call list in accordance with the first likelihood and the second likelihood.

8. The sequential number ringing system of claim 1, wherein the call list can be modified through a remote access point.

9. The sequential number ringing system of claim 8, wherein the remote access point is a web site hosted by a web server.

10. A method for using a Service Control Point (SCP) to connect a calling party to an alternative number associated with a main number, the method comprising:
    receiving a call attempt from the calling party;
    ringing the main number, in response to receiving the call attempt, wherein the main number is the number dialed by the calling party;
    determining whether the main number is busy;
    determining whether the main number is not answered;
    causing the SCP to determine a first alternative number from a first call list or a second call list associated with the main number;
    causing the SCP to connect the calling party to the first alternative number, in response to a determination that the main number is busy; and
    causing the SCP to connect the calling party to the first alternative number, in response to a determination that the main number is not answered;
    wherein the SCP is communicatively coupled to a plurality of Service Switching Points;
    wherein the first call list is used under a first set of conditions and the second call list is used under a second set of conditions, the second set of conditions different from the first set of conditions.

11. A computer readable medium having stored thereon computer-executable instructions for performing the method of claim 10.

12. The method of claim 10, further comprising causing the SCP to determine a second alternative number from a second call list associated with the main number.

13. The method of claim 12, further comprising causing the SCP to connect the calling party to the second alternative number, in response to a determination that a telephone associated with the first alternative number is busy.

14. The method of claim 13, further comprising determining that the telephone associated with the first alternative number is busy by detecting a next event notification.

15. The method of claim 10, further comprising causing the SCP to connect the calling party to the second alternative number, in response to a determination that a telephone associated with the first alternative number is not answered.

16. The method of claim 15, further comprising determining that the telephone associated with the first alternative number is not answered by detecting a next event notification.

17. The method of claim 15, further comprising:
assigning a first likelihood to the first alternative number, the first likelihood indicating a probability that a call can be completed to the telephone associated with the first alternative number; and
assigning a second likelihood to the second alternative number, the second likelihood indicating a probability that a call can be completed to the telephone associated with the second alternative number.

18. The method of claim 17, further comprising ordering the first alternative number and the second alternative number within the call list in accordance with the first likelihood and the second likelihood.

19. A method for using a Service Control Point (SCP) to connect a calling party to an alternative number associated with a main number, the method comprising:
receiving a call attempt from the calling party;
provisioning a T_Busy trigger associated with the main number;
provisioning a T_No_Answer trigger associated with the main number;
ringing the main number, in response to receiving the call attempt, wherein the main number is the number dialed by the calling party;
determining whether the main number is busy;
determining whether the main number is not answered;
causing a Service Switching Point (SSP) to fire the T_Busy trigger, in response to a determination that the main number is busy;
causing the SSP to fire the T_No_Answer trigger, in response to a determination that the main number is not answered;
causing the SCP to determine the alternative number from a first call list or a second call list associated with the main number, in response to the firing of the T_Busy trigger;
causing the SCP to determine the alternative number from a first call list or a second call list associated with the main number, in response to the firing of the T_No_Answer trigger;
causing the SSP to ring the alternative number, in response to a determination that the main number is busy;
causing the SSP to ring the alternative number, in response to a determination that the main number is not answered;
wherein the SOP is communicatively coupled to a plurality of SSPs;
wherein the first call list is used under a first set of conditions and the second call list is used under a second set of conditions, the second set of conditions different from the first set of conditions.

20. A method for using a Service Control Point (SCP) to connect a calling party to an alternative number associated with a main number of a called party, the method comprising:
receiving a call attempt from the calling party;
ringing the main number, in response to receiving the call attempt, wherein the main number is the number dialed by the calling party;
determining whether the main number is busy;
determining whether the main number is not answered;
causing the SCP to determine a first alternative number from a first call list or a second call list associated with the main number, wherein the first call list includes a plurality of alternative telephone numbers that are sequentially ordered based upon a probability of connecting the calling party to called party;
causing the SOP to connect the calling party to the first alternative number, in response to a determination that the main number is busy;
causing the SOP to connect the calling party to the first alternative number, in response to a determination that the main number is not answered;
wherein the SOP is communicatively coupled to a plurality of Service Switching Points;
wherein the first call list is used under a first set of conditions and the second call list is used under a second set of conditions, the second set of conditions different from the first set of conditions.

21. The method of claim 20, wherein the plurality of alternative telephone numbers are listed in an order beginning with the telephone number at which the probability of connecting to the called party is highest and ending with the telephone number at which the probability of connecting to the called party is the lowest.

22. The method of claim 20, further including:
calculating the probabilities of connecting the called party to the called party at the alternative telephone numbers included in the first call list based upon the historical likelihood of the connecting the calling party to the alternative telephone numbers; and
sequentially ordering the alternative telephone numbers included in the first call list based on the calculated probabilities.

23. A method for using a Service Control Point (SCP) to connect a calling party to an alternative number associated with a main number of a called party, the method comprising:
receiving a call attempt from the calling party;
ringing the main number, in response to receiving the call attempt, wherein the main number is the number dialed by the calling party;
determining whether the main number is busy;
determining whether the main number is not answered;
causing the SCP to select a first call list or a second call list from a plurality of user created call lists associated with the main number;
causing the SCP to determine a first alternative number from the first call list;
causing the SCP to connect the calling party to the first alternative number, in response to a determination that the main number is busy;
causing the SCP to connect the calling party to the first alternative number, in response to a determination that the main number is not answered;
wherein the SCP is communicatively coupled to a plurality of Service Switching Points;
wherein the first call list is used under a first set of conditions and the second call list is used under a second set of conditions, the second set of conditions different from the first set of conditions.

24. The method of claim 23, wherein the SCP selects the first call list from the plurality of user created call lists using the time of day that the call attempt was made.

25. The method of claim 23, wherein the SCP selects the first call list from the plurality of user created call lists using the identity of the calling party.

26. The method of claim 23, further including:
determining whether the first call list is enabled, wherein the first call list is only selected responsive to the first call list being enabled.

27. The method of claim 26, further including:
enabling access by a given party to the plurality of user created call lists; and
permitting the given party to manually select which call lists of the plurality of call lists are enabled.

28. The method of claim 26, further including:
enabling access by a given party to the plurality of user created call lists; and
permitting the given party to create selection rules that govern the automatic determination of which call lists of the plurality of call lists are enabled.

29. The method of claim 23, wherein the first call list includes a sequential ordered list of alternative telephone numbers, and the SCP determines the first call list based on the sequential ordered list.

30. The method of claim 23, wherein the SCP determines the first call list from the plurality of user created call lists based on the number of alternative telephone numbers included in the first call list.

31. A sequential number ringing system connecting a calling party to a first or second alternative number associated with a main number dialed by the calling party, the system comprising:
a first Service Switching Point (SSP) connected to a caller telephone;
a second Service Switching Point (SSP) connected to a called telephone having a main telephone number associated therewith, the first SSP and second SSP being connected by a voice trunk communication link and a first SS7 data communication link, wherein the second SSP is provisioned with a trigger list associating the main number with a T_Busy trigger and with a T_No_Answer trigger;
wherein the second SSP is operative to connect the caller telephone to the called telephone in response to the called telephone being answered;
wherein the second SSP is further operative to fire a T_Busy trigger in response to a determination that a call to the called telephone cannot be connected because the called telephone is busy;
wherein the second SSP is further operative to fire the T_No_Answer trigger in response to a determination that a call to the called telephone cannot be connected because the called telephone is not answered within a predefined ring number;
a Service Control Point (SCP) connected to the first SSP by a second SS7 data communication link and connected to the second SSP by a third SS7 data communication link;
a Sequential Ring Application (SRA) resident on the SCP, the SRA having a first call list associated with the main number and containing the first alternative number and a second call list associate with the main number and containing second alternative number;
wherein the SRA is operative to cause the second SSP to connect the caller telephone to the first or second alternative number, in response to a determination that the T_Busy trigger has been fired by the second SSP; and
wherein the SRA is operative to cause the second SSP to connect the caller telephone to the first or second alternative number, in response to a determination that the T_No_Answer trigger has been fired by the second SSP;
wherein the first call list is used under a first set of conditions and the second call list is used under a second set of conditions, the second set of conditions different from the first set of conditions.

32. A sequential number ringing system connecting a calling party to a first alternative number associated with a main number dialed by the calling party, the system comprising:
a first network element with a sequential ring application (SRA) resident thereon; and
a first call list associated with the main number and containing the first alternative number; and
a second network element provisioned with a trigger list associating the main number with a busy signal and with a no answer signal;
wherein the second network element connects the calling party to the main number in response to the main number being answered;
wherein the second network element is further operative to send the busy signal in response to a determination that a call to the main number cannot be connected because the main number is busy;
wherein the second network element is further operative to send the no answer signal in response to a determination that a call to the main number cannot be connected because the main number is not answered within a predefined ring number;
wherein the SRA is operative to cause the second network element to connect the calling party to the first or second alternative number, in response to a determination that the busy signal has been sent;
wherein the first network element is communicatively coupled to a plurality of second network elements; and
wherein the SRA is operative to cause the second network element to connect the calling party to the first or second alternative number, in response to a determination that the no answer signal has been sent;
wherein the first alternative number is used under a first set of conditions and the second alternative number is used under a second set of conditions, the second set of conditions different from the first set of conditions.

* * * * *